Aug. 16, 1966   W. D. HOFER   3,266,579
CASTOR MOUNTING FOR CULTIVATOR SHANKS
Filed June 22, 1964
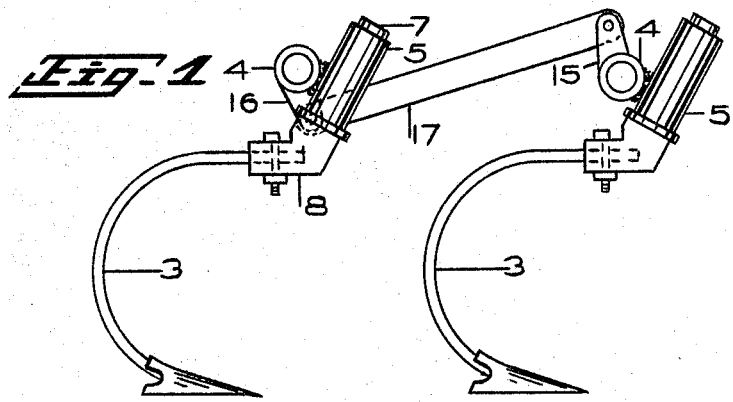
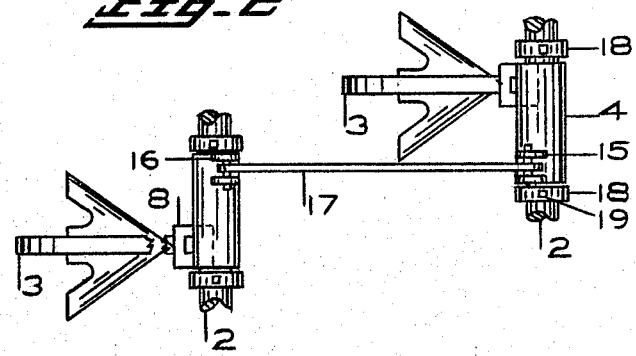
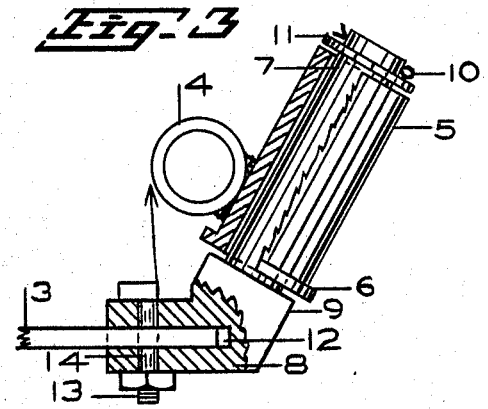
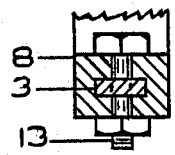

3,266,579
CASTOR MOUNTING FOR CULTIVATOR SHANKS
Walter David Hofer, Brocket, Alberta, Canada
Filed June 22, 1964, Ser. No. 376,839
3 Claims. (Cl. 172—748)

This invention relates to shank mountings for cultivators, having particular reference to a castor mounting by which the shank may turn to follow the pull of the tractor and to avoid obstructions in the ground.

In the art to which the invention relates, shanks for cultivators and like soil working implements more usually have the shank pivoted to move vertically on a cultivator frame cross beam. In this the shank is constrained to travel in a fixed path and may not swing with the pull of the cultivator on turns. In addition obstructions such as stones in the ground may only be avoided by the shank rising.

The present invention is directed to a castor mounting for cultivator shanks by which the shank may turn in the mounting, both in avoiding obstructions and in following the pull of the tractor on turns, and may also be used on a three point hitch cultivator.

Other features and advantages of the invention will become apparent by reference to the accompanying description taken in conjunction with the drawings.

In the drawings, wherein is illustrated a preferred embodiment of the invention, FIG. 1 is a side view of a pair of cultivator shanks connected for operation as a unit, the shank mountings embodying my improvements.

FIG. 2 is a top view of the showing in FIGURE 1, but with the boot portions only of the shank mountings, and including fragments of cultivator cross beams on which the shanks are mounted.

FIG. 3 is an enlarged side view of a shank mounting, including a fragment of a cultivator shank, shown partly broken away and in section.

FIG. 4 is an enlarged rear end view of the shank mounting boot, including the shank with its attaching bolt, shown broken away and with the boot and shank sectioned.

Having reference to the drawings, at 2 (FIG. 2) is indicated tubular cross beams of a cultivator frame on which shanks 3 of the cultivator are mounted.

The shank mountings include for each a sleeve 4 free to turn axially on the cultivator beam, and to the under side of which is fixed, as by welding, an upwardly extending castor sleeve 5, the castor sleeve including an integral annular flange 6 (FIG. 3) at its lower end.

Mounted free to turn in the castor sleeve is a shank mounting comprising a leg 7 with integral rearwardly extending boot portion 8, the boot portions having an annular shoulder 9 bearing against the flange 6. The leg 7 may include means, such as the cotter pin 10 and washer 11, holding the leg in the castor sleeve.

The boot portion 8 has a bore 12 complementary to the cultivator shank 3 to receive the shank therein, and a bolt 13 passing through openings, as at 14, in the shank and the boot portion of the shank mounting may be used for attaching the shank to the boot portion.

In the present showing a pair of cultivator shanks 3 are mounted on the beams 1 and 2 and connected to move as a unit. For this the sleeves 4 on the beams include integral radial arms 15 and 16 upstanding and depending respectively from the sleeves and connected by a bar 17 pivoted to the arms, by which when one shank rises in avoiding an obstruction the companion shank is moved oppositely.

On the cultivator beams 1 and 2 are collars 18 secured by set screws 19 for holding the sleeves 4 against endwise displacement on the beams.

In the use of the device, the shanks 3 are removably mounted in the boot portions 8 of the shank mountings, and the legs 7 are inserted free to turn in the castor sleeves 5. This free turning of the legs 7 allows the cultivator shanks to follow the pull of the tractor by which the implement is drawn and to turn in avoiding obstructions in the ground. The coupling of the sleeves 4 by the bar 17 eliminates the use of springs to cushion the shanks when rising to avoid an obstruction.

What I claim is:

1. In a cultivator having a cross member and a cultivating shank, means mounting the shank on the cross member, said means including a sleeve free to turn axially on the cross member, a castor sleeve fixed to the cross member sleeve, and a shank mounting element, said element including a leg mounted free to turn in the castor sleeve, said leg having a lower boot portion to which the shank is attachable.

2. A shank mounting as set out in claim 1 and in which the boot portion of the shank mounting extends horizontally and has an opening therein in which the upper end portion of the shank is insertable, and including means securing the shank end portion in the boot portion opening.

3. A mounting for attachment of a cultivator shank on a cross beam of the cultivator, the cross beam having a sleeve free to turn axially thereon, said mounting comprising an upwardly extending castor sleeve fixed to the cross beam sleeve, and a mounting element for the shank comprising a leg free to turn axially in the castor sleeve, said leg having an integral rearwardly extending boot portion, and means attaching the cultivator shank to the boot portion of the shank mounting.

References Cited by the Examiner

UNITED STATES PATENTS

| 273,105 | 2/1883 | Kenton | 172—748 X |
| 1,107,733 | 8/1914 | Waterman | 172—657 |
| 1,867,521 | 7/1932 | Mote | 172—657 |
| 2,769,625 | 11/1956 | Wooldridge | 172—657 |

FOREIGN PATENTS

| 209,121 | 1/1924 | Great Britain. |

ANTONIO F. GUIDA, *Primary Examiner.*
JOE O. BOLT, *Examiner.*